United States Patent [19]

Tschudin-Mahrer

[11] Patent Number: 4,506,699
[45] Date of Patent: Mar. 26, 1985

[54] FLAP FOR VENTILATION DUCTS

[75] Inventor: Rolf Tschudin-Mahrer, Lausen, Switzerland

[73] Assignee: Irbit Holding AG, Fribourg, Switzerland

[21] Appl. No.: 458,395

[22] Filed: Jan. 17, 1983

[30] Foreign Application Priority Data

Jan. 28, 1982 [DE] Fed. Rep. of Germany ... 8202047[U]

[51] Int. Cl.³ .............................................. F16K 15/03
[52] U.S. Cl. ..................................... 137/375; 98/119; 137/527; 251/368; 428/140
[58] Field of Search .................. 137/375, 527; 98/102, 98/106, 74, 79, 87, 119; 251/368; 428/139, 140, 319.3, 319.7, 319.9

[56] References Cited

U.S. PATENT DOCUMENTS

| 2,632,722 | 3/1953 | Libberton | 428/140 |
| 3,813,896 | 6/1974 | Lebahn | 98/119 X |
| 4,067,764 | 1/1978 | Walker | 428/140 X |
| 4,191,205 | 3/1980 | Nash | 137/375 |
| 4,263,680 | 4/1981 | Reul | 137/527 X |
| 4,294,283 | 10/1981 | Scharres | 137/601 |
| 4,313,984 | 2/1982 | Moraw | 428/140 X |

Primary Examiner—Robert G. Nilson
Attorney, Agent, or Firm—Martin A. Farber

[57] ABSTRACT

The flap for ventilation ducts, particularly for automobile air-conditioning systems, includes a flap member having opposite surfaces with a predetermined number of openings therein, a longitudinal bottom edge, opposite side edges and an upper edge. A pocket-shaped covering of foam material on the flap member is arranged in two layers which are folded around the longitudinal edge of the flap member onto the opposite surfaces of the foam material including foam sections extending beyond the opposite side edges and the upper edge of the flap member. The layers have a bond-activated foil covering which faces the perforated wide surfaces of the flap, the foil covering connecting the foam-material sections extending beyond the opposite side edges and the upper edge of the flap members. The band activated foil covering further connects the portions of foam-material lying opposite each other at the perforations in the flap member.

4 Claims, 4 Drawing Figures

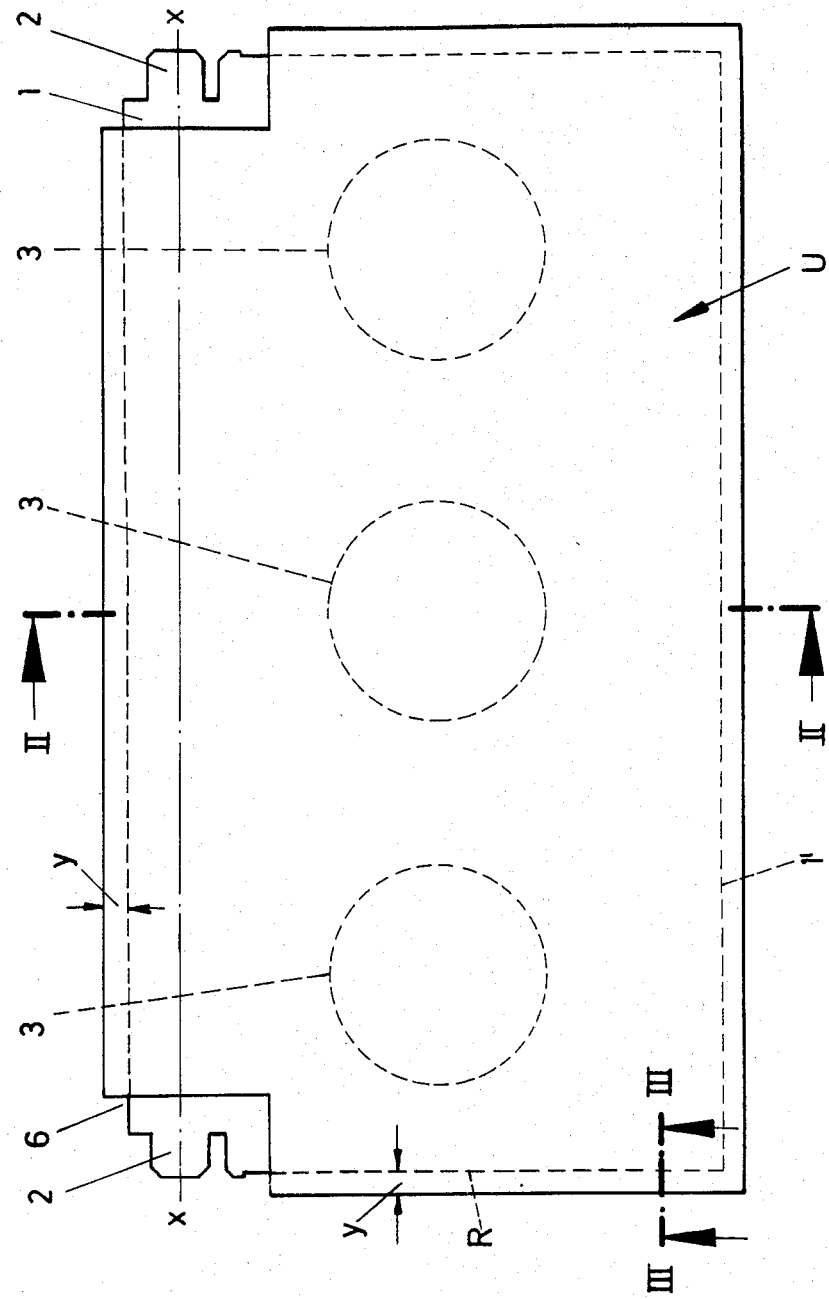

FLAP FOR VENTILATION DUCTS

The present invention relates to a flap for ventilation ducts, particularly for automobile air-conditioning systems.

The object of the invention is to develop such closure flaps in a manner which is easy to manufacture and functions well during use, so that wind noises in particular, as well as noises caused by vibration are substantially avoided.

This object is achieved in accordance with the invention by furnishing a pocket-shaped covering of foam material over a flap having preforated wide sides, in such a manner that two layers of foam material are folded around a longitudinal edge of the flap. The foam material is covered on the surfaces which face the perforated wide sides of the flap with a bond-activated foil which connects the foam material sections that protrude beyond the edges of the flap and the portions of foam material lying opposite each other at the perforations in the flap. It is furthermore advantageous for the fold edge to be arranged on the flap resting edge which is opposite the hinge axis.

As a result of this development a ventilation duct flap which is easy to manufacture and is of high acoustic insulating value is obtained. Thus the air flowing through the ducts and any vibrations of the duct are no longer experienced as a disturbing source of noise. The flap, which can be produced in simple fashion by stamping from a metal plate is placed between the layer of foam material which have been folded so as to form a pocket, the flap being then held fast by bonding of the bond activated foil. Accordingly it is not even necessary to deburr the stamped flap since the foam material provides a cushioned covering that is sufficiently protective of the usually sharp edges. The fastening of the flap in the support means is thus accomplished without any danger of injury. The regions of foam material which protrude beyond the edges of the flap are connected to each other by the foil. As foam material one can even use open-cell material since the bondable foil itself acts as a sealing skin. The bondable foil can be applied to foam layer blanks in a continuous process. The foam covering, which is not firmly attached to the flap blank, is held immovably in place by its attachment in the region of the protruding zones of foam material and by the additional connection within the region of the holes provided in the stamped blank. The region of the foam material which is folded around the one longitudinal edge of the flap forms a particularly stable edge since no interruption in the structure of the foam material is present here. The foam at the longitudinal edge of the flaps thus retains its homogeneous structure, although the pore structure is somewhat compressed. The holes furthermore reduce the weight of the flap and result in a desirable saving of material. Furthermore, it is no longer necessary to provide the flap with an elastic sealing member in the frame of the flap. Such a sealing member is provided directly on the flap by virtue of the foam material covering. Due to the fact that the folded edge is located at the resting edge of the flap which is opposite the hinge axis, the formation of an uninterrupted pocket is obtained on the flap closure body proper. The regions which are to be left free for the swivel support parts lie in the vicinity of the hinge axis.

With the above and other objects and advantages in view, the present invention will become more clearly understood in connection with the detailed description of a preferred embodiment, when considered with the accompanying drawings, of which:

FIG. 1 is a front view of a flap incorporating one embodiment of the invention;

FIG. 2 is a sectional view taken along the line II—II of FIG. 1;

The flap 1, which is of substantially elongated rectangular shape and has a flat surface in the embodiment shown, is provided in the region of its upper two corners with projections 2 cut out from it in order to attach bearing means, not shown in detail. The projections 2 are associated with pin projections or support depressions in mounts of a ventilation duct. The hinge axis of the flap 1 is designated x—x. The flap consists of a metal stamping having a wall thickness of about 1 mm. The middle region of the flap is provided over its entire length with a plurality of holes 3. The holes 3 are circular and are spaced equally from each other. Instead of the three relatively large holes, a plate having an even larger number of holes, or even a screen-like perforated plate can be provided.

The flap 1 is embedded in a pocket-shaped covering U of foam material. The covering U consists of two layers of foam material I and II folded around the lower longitudinal edge 1' of the flap 1. The layers I and II have a basic shape of the same area. The size of the layers I and II is somewhat greater than that of the flap 1, such that a protrusion y extends beyond the edge R of the flap 1 on all sides, equal to about four times the thickness of the flap.

Figure 3:
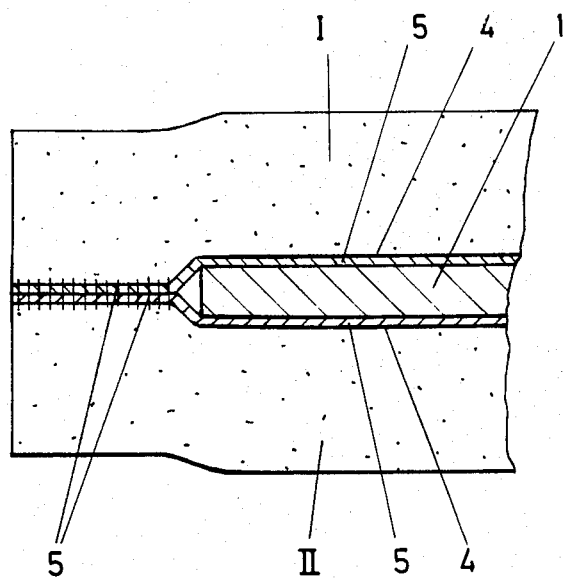
FIG. 3 is an enlarged fragmentary sectional view taken along the line III—III of FIG. 1; and, FIG. 4 is a fragmentary perspective view of the corner region of the layer of foam material with the bondable foil applied.
Figure 4:
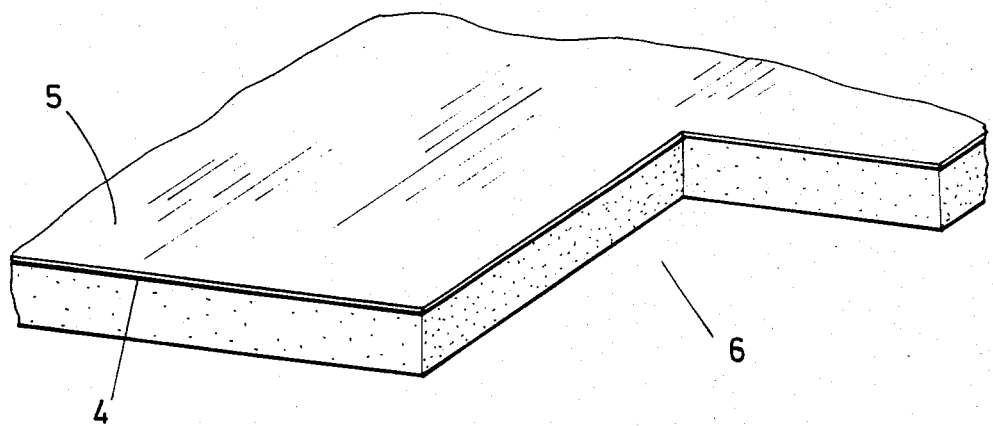

The layers I, II of foam material are covered with a bondable or bond-activated foil 5 on the surfaces 4 thereof which face the wide sides of the flap. The foil 5 is anchored to the foam structure and may be a thermoplastic foil. Thus the edges of foam material which protrude beyond the flap edges R and the portions of foam material lying opposite each other within the region of the holes 3 are attached to each other. The foam covering U is thus fixed in position. Even certain lifting effects in the middle region of the flap, that are assumed to occur as a result of the resiliency of the material, are of no consequence as a result of the penetrating anchoring within the region of the holes 3. A substantially flat structure is thus produced. In the case of small thicknesses of foam material a slight indentation at most is present in the region of the holes 3, as shown in FIGS. 2 and 3. With larger layer thicknesses this indentation or depression is not noticeable. The depression is optically practically insignificant and can also be tolerated since the flaps are arranged, out of view, within the air ducts.

In the corner region which forms the mount the pocket-shaped covering U is cut back. The corresponding niches are designated 6. Mounting parts (not shown) can be engaged with projections 2 of the flap 1 at the exposed portions at the niches 6 to permit movement of the flap.

The flap resting edge 7 which is opposite the hinge axis x—x is transversely rounded as a result of the corresponding folding of the pocket-forming blank of foam material. The rounding corresponds generally to the thickness of the layers but it may be flattened slightly as a result of a predetermined folding tension. The region at the flap resting edge 7 is free of seams, i.e. the foam structure remains homogeneous here.

The foil is of slight wall thickness. For all practical purposes it forms merely a thin skin.

I claim:

1. A flap for a ventilation duct, particularly for automobile air-conditioning systems, comprising
   a flap member having opposite wide surfaces with a predetermined number of openings therein, a longitudinal bottom edge, opposite side edges and an upper edge,
   a pocket-shaped covering of foam material on the flap member, arranged in two layers which are folded around the longitudinal edge of the flap member onto said opposite wide surfaces, said foam material including foam material sections extending beyond the opposite side edges and the upper edge of the flap member, said layers having layer surfaces which face the wide surfaces of the flap member,
   a bond-activated foil covering said layer surfaces, said foil connecting the foam material sections extending beyond the opposite side edges and the upper edge of the flap members,
   said bond-activated foil further connecting portions of the foam material lying opposite each other at the openings in the flap member.

2. The flap according to claim 1, wherein
   the flap member has a flap resting edge and a hinge axis spaced opposite from each other, and
   the folded portion of the foam material adjacent the longitudinal edge of the flap member comprises said flap resting edge.

3. The flap according to claim 2, wherein
   the flap member has projections at said hinge axis and the foam material includes notch portions at said hinge axis exposing said projections adapting the latter for mounting engagement of the flap member with the duct.

4. The flap according to claim 1, wherein
   the flap member is a stamping.

* * * * *